Patented Feb. 27, 1934

1,949,247

UNITED STATES PATENT OFFICE 1,949,247

ALKYLOLAMINE-DERIVATIVES AND PROCESS OF PREPARING THEM

Otto Eisleb, Hofheim-on-the-Taunus, Germany, assignor to Winthrop Chemical Company, Inc., New York, N. Y., a corporation of New York No Drawing. Application May 28, 1931, Serial No. 540,809. In Germany June 10, 1930

9 Claims. (Cl. 260—127)

The present invention relates to alkylolamine-derivatives, more particularly to compounds of the following general formula

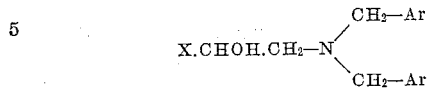

wherein each of the Ar stands for an aromatic radical which may be substituted by chlorine and X stands for hydrogen or an alkyl radical and to a process of preparing them.

I have found that compounds of the above constitution are obtained by causing a 1-aminoalkylol-2 to react with an arylmethyl chloride the aryl radical of which may be substituted by chlorine. The reaction may be carried out by bringing together the components at a temperature of about 60° C. to about 110° C., while stirring the reaction mixture. It is advantageous to carry out the reaction in the presence of an acid-binding substance, as for instance, potassium carbonate, and to add water to the reaction mixture, when the reaction is finished. By addition of ether the reaction product may then be separated from the solution and is obtained by distillation of the residue which remains after removing the ether dried by the addition of potassium carbonate.

The new substances are useful intermediates for preparing new compounds of various kinds, especially for preparing new therapeutics and dyestuffs.

The following examples serve to illustrate the invention, but they are not intended to limit it thereto, the parts being by weight.

(1) 61 parts of 1-aminoethanol-2 and 253 parts of benzyl chloride are mixed together, while stirring. The temperature of the mixture soon rises, but is prevented from rising above 90° C. by suitably cooling the mixture. When spontaneous evolution of heat has ceased, 140 parts of powdered dry potassium carbonate are slowly introduced at a temperature between 85° C. and 90° C.; the mixture is then stirred for 2 hours at water bath temperature. It is then diluted with 500 parts of water, the whole is cooled, the oil which separates after the dilution is extracted with about 200 parts of ether, the extract is dried by means of potassium carbonate and distilled. The product distills under 8 mm. pressure at about 203° C. or under 3 mm. pressure at about 175° C., yielding a colorless oil which completely solidifies on cooling. 220 parts of n,n-dibenzylaminoethanol are obtained in the form of large crystals melting at 46° C.–47° C. The product is easily soluble in ether and benzene and only sparingly soluble in water; it can be recrystallized from dilute alcohol. The hydrochloride of n,n-dibenzylaminoethylchloride which is formed smoothly from n,n-dibenzylaminoethanol and thionyl chloride recrystallizes from alcohol in the form of laminæ melting at 192° C.

(2) 122 parts of 1-amino-ethanol-2 and 253 parts of benzyl chloride are caused to react and the reaction mixture is further heated for 2 hours on the water bath. After cooling a concentrated potassium carbonate solution and ether are added. The ethereal solution is separated, dried by means of potassium carbonate, and distilled in a vacuum; about 85 parts of benzyl chloride first pass over and then, at 170° C.–175° C. under 3 mm. pressure, 161 parts of n,n-dibenzylaminoethanol.

(3) 322 parts of 4-chlorbenzylchloride are added at 60° C.–80° C., while stirring, to 183 parts of 1-amino-ethanol-2. The mixture is then kept for 2 hours at 100° C. After cooling, ether and potassium carbonate solution are added and the whole is shaken. The ethereal solution is separated and dried by means of potassium carbonate; it yields on distillation under 3 mm. pressure n,n-[di-(4-chlorbenzyl)]-aminoethanol, boiling at 212° C. The product is a colorless thick oil. The hydrochloride forms colorless crystals which only sparingly dissolve in water.

(4) 106 parts of α-menaphthylchloride are introduced at 90° C.–100° C. drop by drop, while stirring, into 36 parts of 1-amino-ethanol-2, and 42 parts of powdered sodium carbonate are then slowly added. The mixture is kept, while stirring, for 2 hours at 100° C.–105° C. After cooling water and ether are added. The ethereal solution is separated, after shaking, and dried by means of potassium carbonate; it yields on distillation under 3 mm. pressure 92 parts of n,n-[di-α'-menaphthyl]-aminoethanol boiling at 283° C. There is first obtained a brownish oil which soon solidifies to a body which melts at 80° C.–81° C. Its hydrochloride sparingly dissolves in water and alcohol, crystallizes well from methyl alcohol and melts at 211° C.–212° C.

(5) 75 parts of 1-aminopropanol-2 are caused to react with 253 parts of benzyl chloride in the manner indicated in Example 1, 140 parts of potassium carbonate being introduced. After working up the reaction mixture, the 1-n,n-dibenzylaminopropanol-2 is obtained in the form of a colorless oil which distills under 6 mm. pressure at about 188° C. and under 3 mm. pressure at about 168° C.

I claim:

1. The compounds of the following general formula

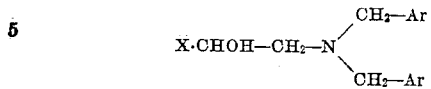

wherein each of the Ar stands for a benzene or naphthalene radical which may be substituted by chlorine, and X stands for hydrogen or lower alkyl.

2. The compounds of the following general formula

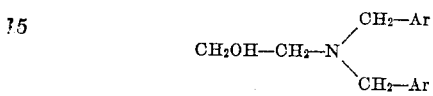

wherein each of the Ar stands for a benzene or naphthalene radical which may be substituted by chlorine.

3. The n,n-(dizenzyl)-aminoethanol of the following probable formula

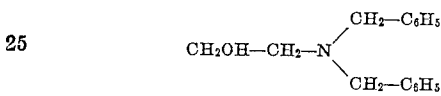

which forms crystals melting at 46° C.–47° C., readily soluble in ether and benzene, nearly insoluble in water, recrystallizable from dilute alcohol and the hydrochloride of which melts, when recrystallized from alcohol, at 192° C.

4. The n,n-[di-(4-chlorbenzyl)]-aminoethanol of the following probable formula

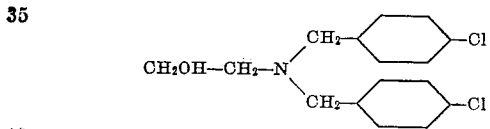

which is a colorless thick oil, boiling at 212° C. under a pressure of 3 mm. and the hydrochloride of which forms colorless crystals, only sparingly soluble in water.

5. The n,n-(di-α'-menaphthyl) aminoethanol of the following probable formula

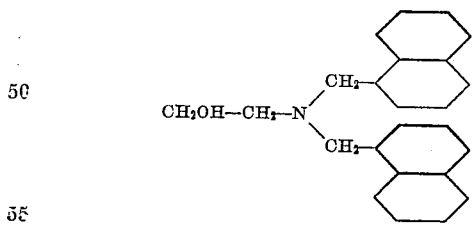

which is a brownish crystallized product, melting at 80° C.–81° C. and the hydrochloride of which is sparingly soluble in water and in ethyl alcohol, crystallizes easily from methyl alcohol and melts at 211° C.–212° C.

6. The process which comprises heating at a temperature of about 60° C. to about 110° C. 1-amino-alkylols-2 of the lower aliphatic series with a compound of the following general formula Ar.CH₂Cl wherein Ar stands for a benzene or naphthalene radical which may be substituted by chlorine.

7. The process which comprises heating at a temperature of about 60° C. to about 110° C. 1-amino-alkylols-2 of the lower aliphatic series with a compound of the following general formula Ar.CH₂Cl wherein Ar stands for a benzene or naphthalene group, which may be substituted by chlorine.

8. The process which comprises heating at a temperature of about 60° C. to about 110° C. 1-amino-alkylols-2 of the lower aliphatic series in the presence of acid-binding agents with a compound of the following general formula Ar.CH₂Cl wherein Ar stands for a benzene or naphthalene radical which may be substituted by chlorine.

9. The process which comprises heating at a temperature of about 60° C. to about 110° C. 1-amino-alkylols-2 of the lower aliphatic series in the presence of potassium carbonate with a compound of the following general formula Ar.CH₂Cl wherein Ar stands for a benzene or naphthalene group which may be substituted by chlorine.

OTTO EISLEB.